United States Patent

Gullichsen et al.

Patent Number: 6,005,611
Date of Patent: *Dec. 21, 1999

[54] WIDE-ANGLE IMAGE DEWARPING METHOD AND APPARATUS

[75] Inventors: Eric Gullichsen; Susan Wyshynski, both of Sausalito, Calif.

[73] Assignee: Be Here Corporation, Cupertino, Calif.

[*] Notice: This patent is subject to a terminal disclaimer.

[21] Appl. No.: 09/128,963

[22] Filed: Aug. 4, 1998

Related U.S. Application Data

[63] Continuation of application No. 08/250,594, May 27, 1994, Pat. No. 5,796,426.

[51] Int. Cl.[6] ................................................. H04N 5/225
[52] U.S. Cl. .......................... 348/211; 348/207; 348/39; 348/143
[58] Field of Search ........................... 348/36, 25, 20, 348/143, 147, 37, 38, 39; 382/293, 294, 300, 285, 153, 154; 345/427, 425, 430, 436; H04N 5/225

[56] References Cited

U.S. PATENT DOCUMENTS

| | | |
|---|---|---|
| 4,728,839 | 3/1988 | Coughlan et al. ....................... 348/143 |
| 5,185,667 | 2/1993 | Zimmermann ........................... 348/207 |
| 5,796,426 | 8/1998 | Gullichsen et al. ..................... 348/207 |
| 5,877,801 | 3/1999 | Martin et al. ............................. 348/36 |

Primary Examiner—Tuan Ho
Attorney, Agent, or Firm—Blakely, Sokoloff, Taylor & Zafman LLP

[57] ABSTRACT

A method and apparatus for transforming wide angle video into perspective corrected viewing zones which either a single user or multiple users may select, orient and magnify. The present invention first captures a wide angle digital video input by any suitable means. The captured image is then stored in a suitable memory means so portions of the image may be selected at a later time. When a portion of the stored video is selected for viewing, a plurality of discrete viewing vectors in three dimensional space are chosen on the video input and transformed to a plurality of control points in a two dimensional plane or any other suitable surface. The area between these points which is still warped from the original wide angle image capture is then transformed to a perspective corrected field of view. The perspective corrected field of view is then displayed on a suitable displaying apparatus, such as a monitor or head mounted display.

20 Claims, 9 Drawing Sheets

HARDWARE TEXTURING ENGINE

WIDE-ANGLE IMAGE DEWARPING METHOD AND APPARATUS

This is a continuation of prior application 08/250,594 filed May 27, 1994 U.S. Pat. No. 5,796,426.

FIELD OF THE INVENTION

The present invention relates to a method and apparatus for displaying a perspective corrected field of view from wide angle video sources, and more particularly relates to permitting the user of an orientation sensing means to view a selected portion of stored or real time video encoded from a wide angle source and transforming that portion to a perspective-corrected field of view.

BACKGROUND OF THE INVENTION

"Virtual reality" and "telepresence" have become extremely popular for use in research, industrial and entertainment applications. In "virtual reality", or VR, a user is permitted to view a computer-generated graphical representation of a selected environment. Depending on the sophistication of the hardware and software used to generate the virtual reality environment, the user may be treated to a three dimensional view of the simulated environment. In "telepresence," a user is permitted to view a real-world, live or recorded environment from a three dimensional perspective.

In addition, in some higher end systems the user is permitted to see different portions of the VR and telepresence environments simply by moving or orienting his head in one or more degrees of freedom. This permits the user to obtain the sensation that he is immersed in the computer-generated/real-world environment. High end devices detect pan, roll and tilt motions by the user and cause the environment to change accordingly. The pan\tilt\roll motions may be inputted by many types of input devices, such as joysticks, buttons or head orientation sensors (which may be connected to head mounted displays).

In VR applications, a continuing problem is how to render a three dimensional environment of the quality and speed users want while offering the product at a price they can afford. To make a realistic environment, such as in a three dimensional video game, many three dimensional polygons need to be rendered. This rendering requires prohibitively expensive hardware which greatly restricts the commercial value of such a system.

In relation to telepresence applications, a continuing problem with the prior art is how to encode sufficient data that a viewer may arbitrarily move his viewing perspective within the telepresence environment and not look beyond the field of view. One relatively simple solution, where the telepresence environment is based on a real three dimensional environment, is to simply use the head orientation sensors to cause a camera to track the orientation of the viewer. This has obvious limitations in that only one viewer can be in the telepresence environment at a time (since the camera can only track one viewer, and the other viewers will not typically be able to follow the head motions of the controlling viewer) and, also, prerecorded data cannot be used. Further, there is an inherent delay between a change in user viewing perspective and the time that it takes to realign the corresponding camera. These limitations greatly restrict the value of such systems.

One method for overcoming each of these limitations is to encode, either in real time or by pre-recording, a field of view largely equivalent to the entire range of motion vision of a viewer—that is, what the viewer would see if he moved his head in each permitted direction throughout the entire permissible range. For example, encoding substantially a full hemisphere of visual information would permit a plurality of viewers a reasonable degree of freedom to interactively look in a range of directions within the telepresence environment.

The difficulty with this approach is that most means for encoding such information distort, or warp, the visual data, so that the information must be corrected, or "de-warped" before a viewer can readily assimilate it. For example, a typical approach for encoding substantially a full hemisphere of information involves using a fish-eye lens. Fish-eye lenses, by their nature, convert a three dimensional scene to a two-dimensional representation by compressing the data at the periphery of the field of view. For the information to be viewed comfortably by a viewer in the VR environment, the visual data must be decompressed, or dewarped, so that it is presented in normal perspective as a two dimensional representation.

One solution to the distortion problem is proposed in U.S. Pat. No. 5,185,667 issued to Steven Zimmerman. The '667 patent describes an apparatus which effects camera control for pan, tilt, rotate and zoom while having no moving parts. Through the use of a fisheye lens and a complicated trigonometric technique, portions of the video images can be dewarped. However, the solution proposed by the '667 patent is impractical because it is insufficiently flexible to accommodate the use of other lenses besides a theoretically perfect hemispherical fisheye lens without the introduction of mathematical errors due to the misfit between the theoretical and the actual lens characteristics. This solution also introduces undesirable trigonometric complexity which slows down the transformation and is overly expensive to implement. This solution further maps each individual pixel through the complex trigonometric mapping formula further reducing the speed of the transformation from one coordinate system to another.

As a result, there has been a substantial need for a method and apparatus which can dewarp encoded wide angle visual data with sufficient speed and accuracy to permit a viewer to immerse himself in a VR or telepresence environment and look around within the environment while at the same time permitting other viewers concurrently to independently engage in the same activity on the same broadcast video signal. There has also been a need for a method and apparatus capable of providing such dewarping on a general purpose high speed computer.

SUMMARY OF THE INVENTION

The present invention overcomes the limitations of the prior art. In particular, the present invention transforms a plurality of viewing vectors within a selected portion of the wide angle, three dimensional video input into two dimensional control points and uses a comparatively simple method to transform the image between the control points to create a perspective-corrected field of view.

More specifically, the present invention is drawn to a method and apparatus which provides perspective corrected views of live, prerecorded or simulated wide angle environments. The present invention first captures a wide angle digital video input by any suitable means, such as through the combination of a high resolution video camera, hemispherical fisheye lens and real time digital image capture board. The captured image is then stored in a suitable memory means so portions of the image may be selected at a later time.

When a portion of the stored video is selected, a plurality of discrete viewing vectors in three dimensional space are chosen and transformed into a plurality of control points in a corresponding two dimensional plane. The area between the control points, which is still warped from the original wide angle image capture, is then transformed into a perspective corrected field of view through a biquadratic polynomial mapping technique. The perspective corrected field of view is then displayed on a suitable displaying apparatus, such as a monitor or head mounted display. The present invention further has the ability to sense an inputted selection, orientation and magnification of a new portion of the stored video for transformation.

In comparison with the prior art, the present invention provides a dependable, low cost, faster and more elegantly simple solution to dewarping wide angle three dimensional images. The present invention also allows for simultaneous, dynamic transformation of wide angle video to multiple viewers and provides each user with the ability to access and manipulate the same or different portions of the video input. In VR applications, the present invention also allows the computer generated three dimensional polygons to be rendered in advance; thus, users may view the environments from any orientation quickly and without expensive rendering hardware.

It is therefore one object of the present invention to provide a method and apparatus for dewarping wide angle video to a perspective corrected field of view which can then be displayed.

It is another object of the present invention to provide a method and apparatus which can simultaneously transform the same or different portions of wide angle video input for different users.

It is yet another object of the present invention to provide a method and apparatus which allows selection and orientation of any portion of the video input.

It is still another object of the present invention to provide a method and apparatus for magnification of the video input.

It is still another object of the present invention to provide a method and apparatus which performs all of the foregoing objects while having no moving parts.

These and other objects of the invention will be better understood from the following Detailed Description of the Invention, taken together with the attached Figures.

THE FIGURES

FIG. 1 shows a functional block diagram of one embodiment of the present invention.

FIG. 2 diagrams the geometry between three dimensional (X-Y-Z) space and its corresponding two dimensional (U-V) plane.

DETAILED DESCRIPTION OF THE INVENTION

Figure 1:
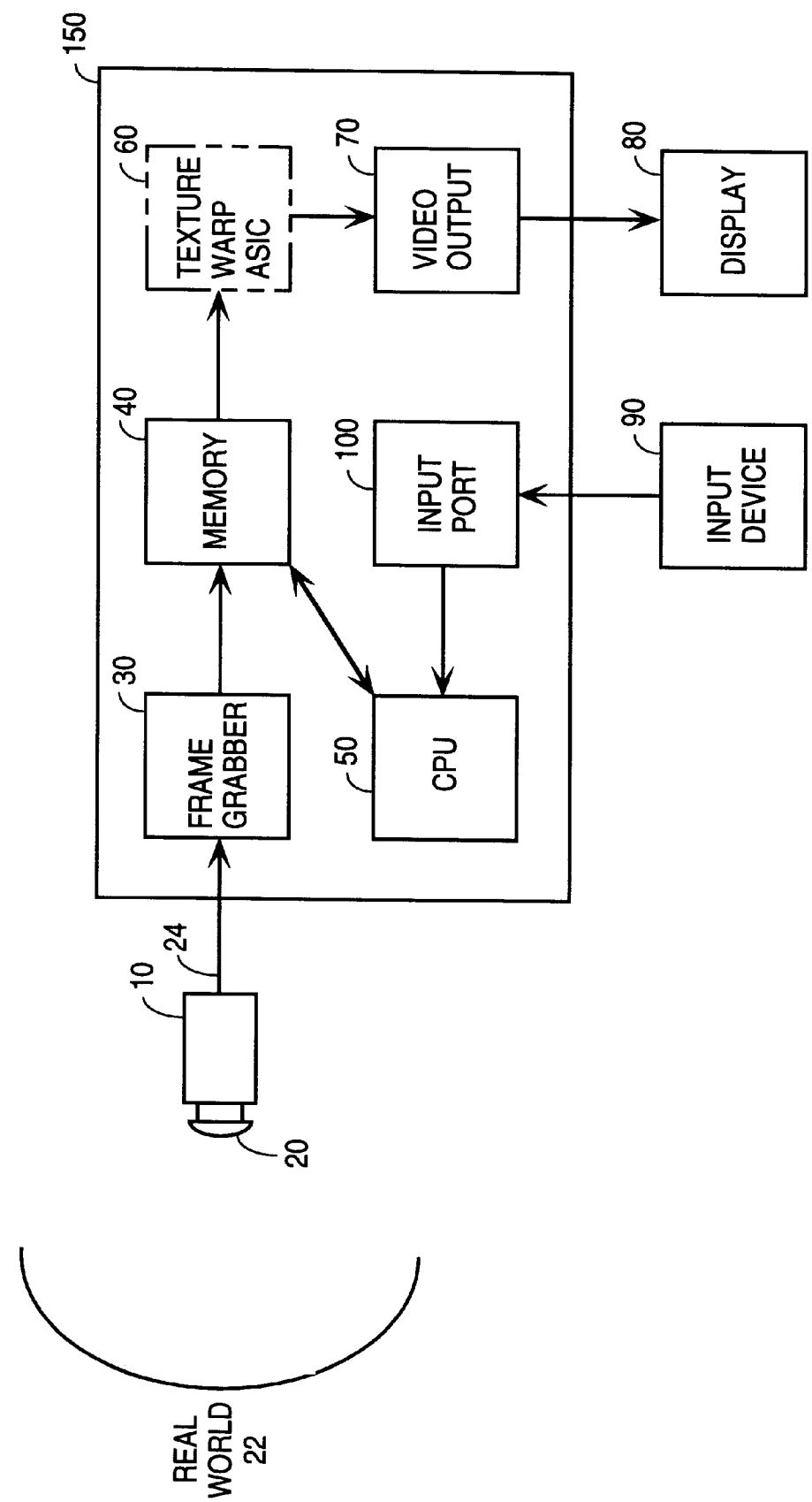

Referring now to FIG. 1, an embodiment of the present invention for processing wide angle video information in real time is shown. A high resolution video camera 10 having a wide angle lens 20, such as a hemispherical fisheye lens, is directed to a real world scene 22. The output 24 of the camera 10 is provided to a real time image digitizing board 30, commonly referred to as a "frame grabber," located in or operatively connected to a conventional high speed computer indicated generally at 150. The camera 10 may be any camera which is capable of using a wide angle lens and providing suitable resolution. In most instances the camera will be a video camera, although in some instances it may be desirable to use a still frame camera. One suitable fisheye lens is the Nikkor Auto 1:1.8 f=8 mm fisheye lens which can be adapted to a standard high resolution broadcast video camera with a Nikon FW-Eng TMW-B1 converter. The computer 150 is any computer capable of receiving and processing video information at an acceptable rate and may, for example, be an 80486-based or Pentium™-based system, or other computer platform such as are made by Silicon Graphics, Sun Micro Systems, Apple Computer, or similar other computer manufacturers.

The fisheye lens 20 causes the video output signal 24 from the camera 10 to be optically warped in a non-linear manner. Before the image can be comfortably viewed by a user, perspective-correcting measures must be taken. The digitized video signal 24 is thus transferred through the digitizing board 30 (typically but not necessarily operating at 30 frames per second) into memory 40 of the computer 150 so that portions of the video picture can be randomly accessed by a microprocessor 50, also within the computer 150, at any time.

The dewarping software is also stored in memory 40 and is applied to the video signal 24 by the microprocessor 50. The stored video signal is then transmitted from memory 40 to a special purpose ASIC 60 capable of biquadratic or higher order polynomial transformations for texture warping and interpolation. Alternatively, the texture warping ASIC 60 may be omitted and its functionality may be performed by software. Phantom lines have been used to show the optional nature of ASIC 60. The perspective corrected video signal is next transmitted to a video output stage 70, such as a standard VGA card, and from there displayed on a suitable monitor, head mounted display or the like 80. An input device 90, such as a joystick or headtracker (which senses the head movements of a user wearing a headmounted display), transmits position information through a suitable input port 100, such as a standard serial, parallel or game port, to the microprocessor 50 to control the portion of the stored video that is selected, dewarped and displayed. The input device 90 also transmits roll/pitch/yaw information to the microprocessor 50 so that a user may control the orientation of the dewarped video signal. Further, one skilled in the art will appreciate that a magnification option could be added to the input device 90 to allow the user to magnify the selected portion of video input, constrained only by the resolution of the camera 10.

Figure 2:
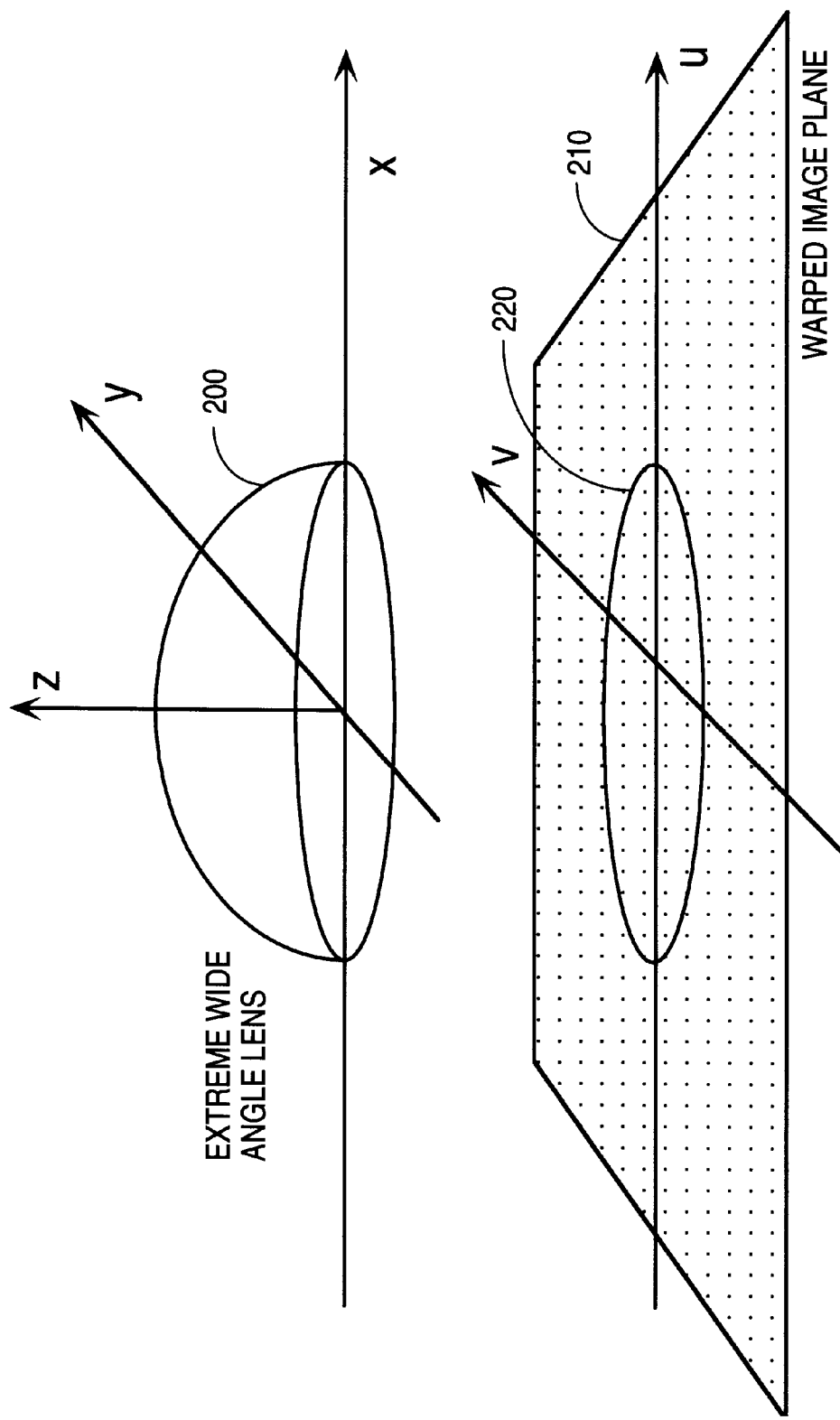

FIG. 2 shows a real world three dimensional environment 200 which has been imaged by the wide angle lens 20. This environment is defined by the Cartesian coordinate system in X, Y and Z with the viewpoint defined to be the origin of the coordinate system. The viewing direction of the user, as defined by the input device 90, is given as a viewing vector in the X-Y-Z coordinate system. The image plane 210 containing the warped wide angle image is defined by a two dimensional coordinate system in U and V, with the origin of the coordinate system coincident with the origin of the X-Y-Z coordinate system. If the field of view of the lens 20 is sufficient, and the lens is rotationally symmetric about the viewing axis, the digitized warped image will be roughly circular in the U-V plane.

Figure 3:
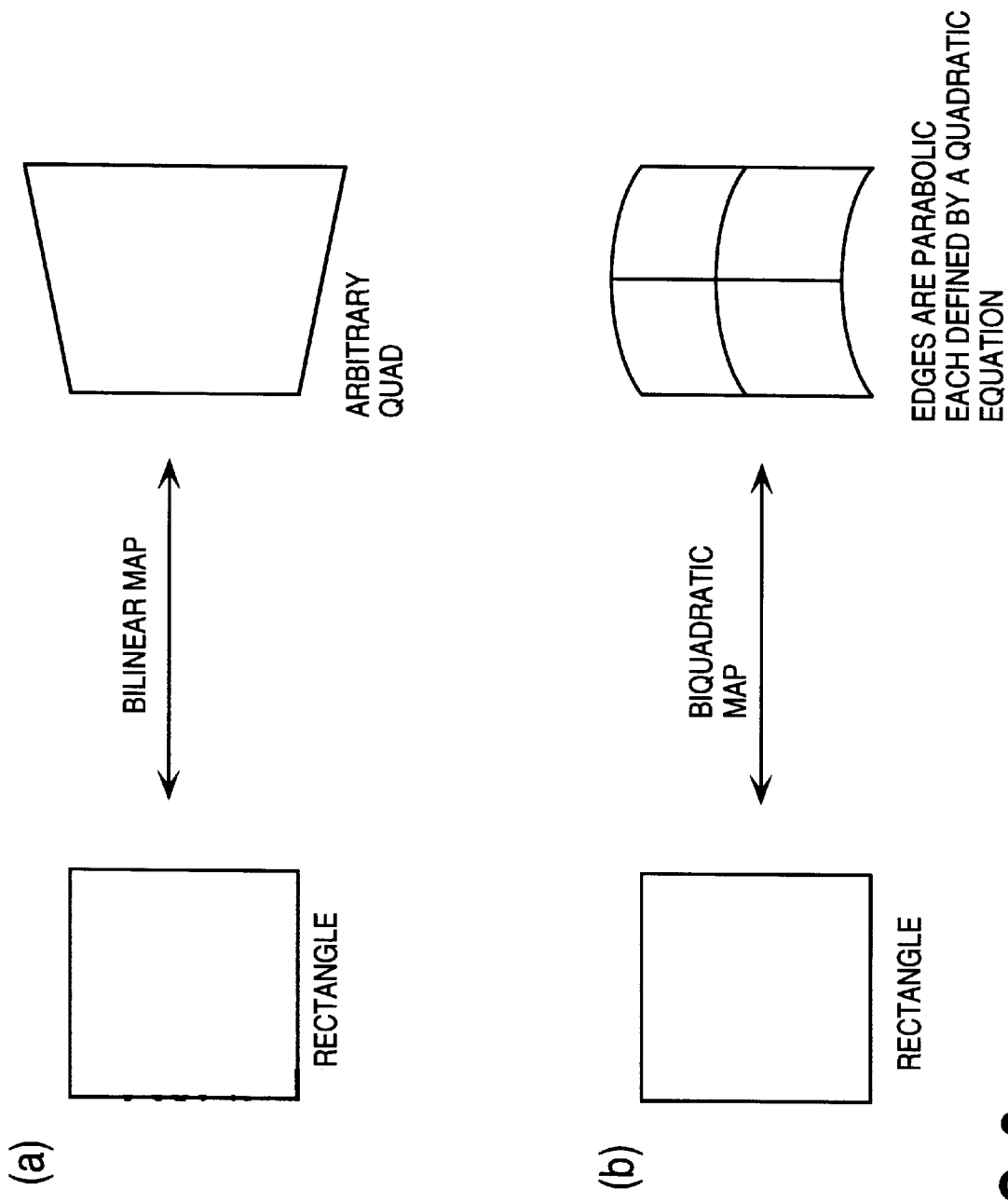
FIG. 3a shows a bilinear mapping of a warped image.
FIG. 3b shows a biquadratic mapping of a warped image.

The first generation of ASICs, developed for low-cost texture mapping of three dimensional graphics, mapped video images through a bilinear technique, such as is shown in FIG. 3(a). These chips were able to apply linear interpolation to texture pixels in both the X and Y directions and could thereby stretch rectangular source textures to any two dimensional quadrilateral shape. An example of a chip of this type is the Artist Graphics 3GA chip. These bilinear chips do, however, introduce texture errors for polygons whose vertices have been subject to significant amounts of perspective, and further are not capable of sufficiently high order texture distortion to adequately flatten extreme wide angle views, such as with hemispherical fisheye lenses.

FIG. 3b shows an example of a biquadratic technique, such as is now coming onto the market. The preferred embodiment of the present invention uses an ASIC chip which implements a texture warping technique of at least second polynomial order. The present invention is of sufficient simplicity that this technique could also be implemented in software on a general purpose high speed computer, such as a Silicon Graphics Indigo™ computer or a Pentium™ based computer.

Figure 4:
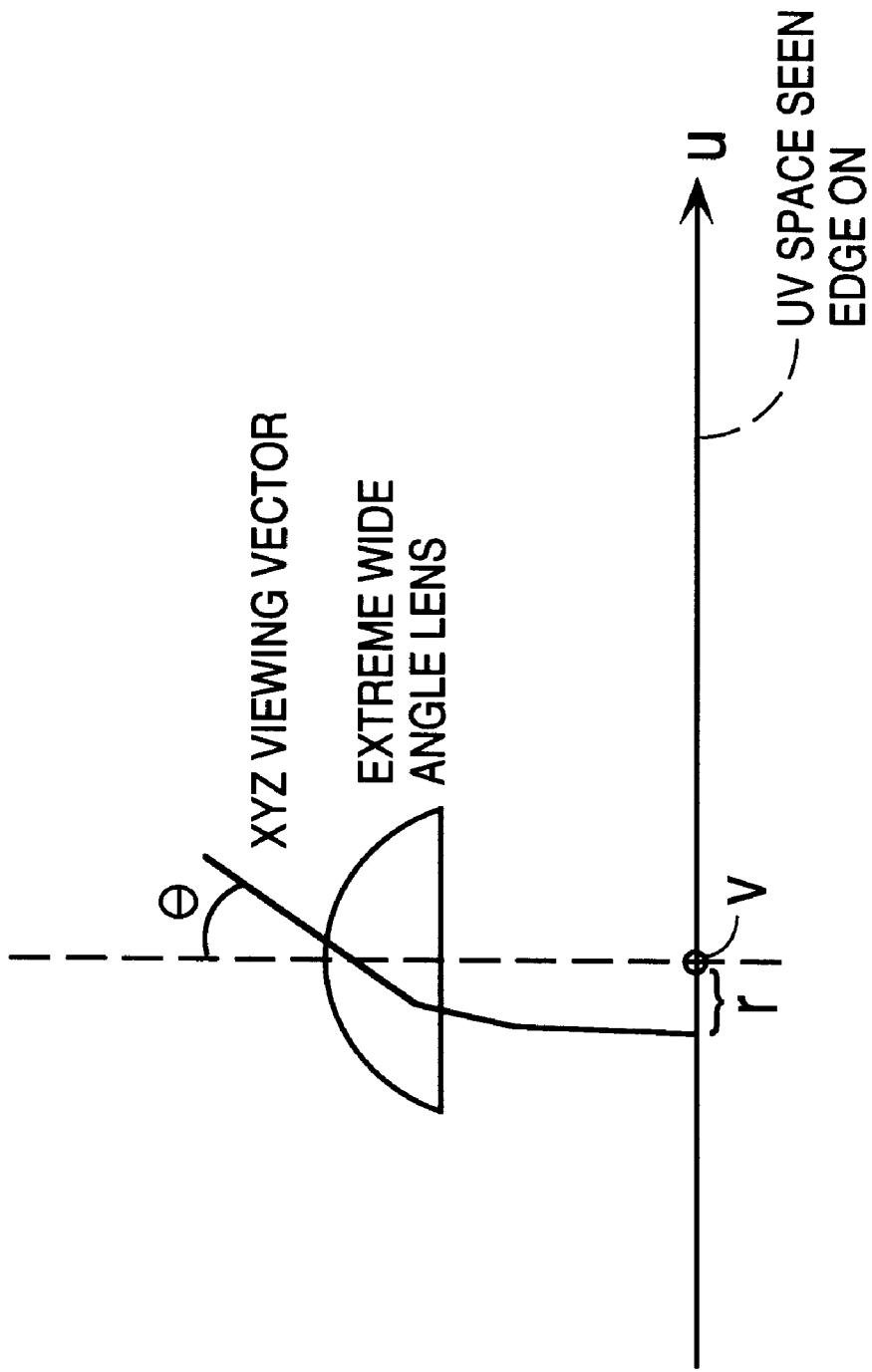
FIG. 4 shows a side view of a viewing vector from a three dimensional (X-Y-Z) wide angle lens as it is seen on a two dimensional (U-V) plane.

The warped image in the U-V plane, shown in FIG. 2, has a radius 220 equal to RADIUS pixels with an origin at UORIGIN and VORIGIN. For any rotationally symmetric lens, the warping effect of the lens can be described by a single lens equation, $r=f(\theta)$, where the function $f(\theta)$ maps any incident ray at angle $\theta$ from the axis of viewing to a radial displacement in pixels, r, from the center of the U-V plane, as shown in FIG. 4.

For any given viewing direction in three dimensional X-Y-Z space, we then have:

$$s = \sqrt{x^2 + y^2} \qquad (1)$$
$$\theta = \arctan\frac{s}{z}$$
$$r = f(\theta)$$
$$u = \frac{rx}{s}$$
$$v = \frac{ry}{s}$$

In the case of an ideal hemispheric fisheye lens, $f(\theta) = (RADIUS)(\sin(\theta))$ and the lens equation which results is:

$$r = \frac{(RADIUS)(s)}{z\sqrt{1+\frac{s^2}{z^2}}} = \frac{(RADIUS)\sqrt{x^2+y^2}}{z\sqrt{1+\frac{x^2+y^2}{z^2}}} \qquad (2)$$

Equations (1) convert an inputted X-Y-Z three dimensional viewing vector into a corresponding control point in the U-V plane.

Figure 5:
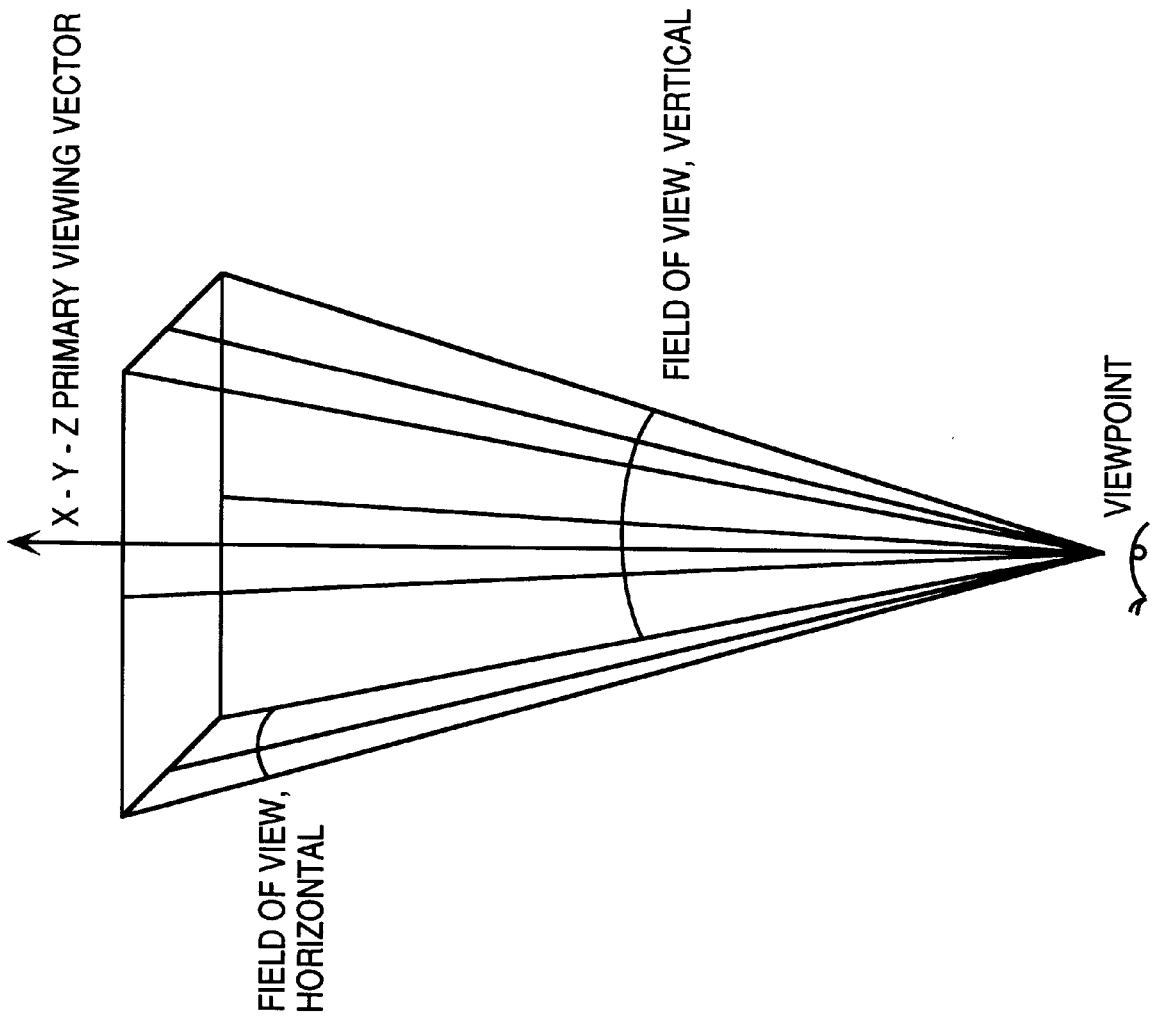
FIG. 5 shows a three dimensional field of view along with a plurality of viewing vectors according to the present invention.

To dewarp a rectangular portion of the wide angle video input for a given viewing direction (x,y,z), eight other viewing vectors, which surround the primary viewing vector, are computed at the field of view angles fov_h and fov_v from the primary viewing vector, as shown in FIG. 5. Each of these nine vectors are then projected from three dimensional X-Y-Z space to the two dimensional U-V plane by equations (1). The result is a 3×3 grid of control points in the U-V plane, with the edges of the grid curving mathematically to conform with the curvature induced by the warping effect of the wide angle lens.

The global bivariate polynomial transformation:

$$u = \sum_{i=0}^{N}\sum_{j=0}^{N-i} a_{ij} x^i y^j \qquad (3)$$

$$v = \sum_{i=0}^{N}\sum_{j=0}^{N-i} b_{ij} x^i y^j$$

with $x$ and $y$ now referring to the pixel coordinates in the output device is then found to describe the geometric correction necessary to transform the region within the warped 3×3 grid in the U-V plane into a perspective corrected field of view. A biquadratic polynomial transformation, N=2 in the above equations, has been selected because a second order polynomial approximates the warping characteristics of most lenses to an adequately high degree of precision and because there is existing hardware to perform the resulting biquadratic transformation. However, it will be appreciated by one skilled in the art that other polynomial transformations of higher degree could be used to increase the precision of the transformation.

Expanding the above equations (3):

$$\begin{bmatrix} u_1 \\ u_2 \\ u_3 \\ u_4 \\ u_5 \\ u_6 \\ u_7 \\ u_8 \\ u_9 \end{bmatrix} = \begin{bmatrix} 1 & x_1 & y_1 & x_1 y_1 & x_1^2 & x_1^2 \\ 1 & x_2 & y_2 & x_2 y_2 & x_2^2 & x_2^2 \\ 1 & x_3 & y_3 & x_3 y_3 & x_3^2 & x_3^2 \\ 1 & x_4 & y_4 & x_4 y_4 & x_4^2 & x_4^2 \\ 1 & x_5 & y_5 & x_5 y_5 & x_5^2 & x_5^2 \\ 1 & x_6 & y_6 & x_6 y_6 & x_6^2 & x_6^2 \\ 1 & x_7 & y_7 & x_7 y_7 & x_7^2 & x_7^2 \\ 1 & x_8 & y_8 & x_8 y_8 & x_8^2 & x_8^2 \\ 1 & x_9 & y_9 & x_9 y_9 & x_9^2 & x_9^2 \end{bmatrix} \begin{bmatrix} a_{00} \\ a_{10} \\ a_{01} \\ a_{11} \\ a_{20} \\ a_{02} \end{bmatrix} \qquad (4)$$

The values for v and $b_{ij}$ can be similarly found. In matrix form, the expanded equations (4) can be written as:

U=WA

V=WB  (5)

To discover $a_{ij}$ and $b_{ij}$ according to the method of the present invention, a pseudo-inverse technique is used. However, one skilled in the art will appreciate that there are methods to solve equations (5) other than by a pseudo inverse technique, i.e. a least squares technique. The pseudo-inverse solutions for A and B in the above equation (5) are:

$$A = (W^T W)^{-1} W^T U$$
$$B = (W^T W)^{-1} W^T V \qquad (6)$$

Therefore, for a target display of a given pixel resolution N×M, W and its pseudo-inverse $(W^T W)^{-1} W^T$ can be calculated a priori. The values for $a_{ij}$ and $b_{ij}$ are then found by mapping the points in the U-V plane for the 3×3 grid of control points using the above equations (6). The biquadratic polynomial transformations of the equations (3) are then used to transform the area between the control points. In this embodiment, the determination of the coordinates of each pixel in the U-V plane takes a total of thirteen multiplication and ten addition operations. Additionally, three of the required multiplication operations per pixel may be obviated by storing a table of xy, $x^2$ and $y^2$ values for each xy coordinate pair in the dewarped destination image. In another embodiment, the "x" values which do not vary as "y" changes (i.e. $a_1$* x+$a_4$* $x^2$ and $b_1$* x+$b_4$* $x^2$) may also be precomputed and stored. Likewise, the "y" values which do not vary as "x" changes may be precomputed and stored. These further optimizations reduce the operations needed to determine the coordinates of each pixel in the U-V plane to two multiplication and four addition operations.

It will be appreciated by one skilled in the art that the accuracy of the dewarping transformation will increase as the number of transformed viewing vectors increases, i.e. a 4×4 grid of control points will produce a more accurate transformation than a 3×3 grid of control points. However, the amount of increase in accuracy quickly draws near an asymptote as the number of control points is increased. One skilled in the art will recognize, therefore, that there is little reason in increasing the number of viewing vectors to more than half of the total number of pixels in the displayed region.

It will be further appreciated by one skilled in the art that the selection of a rectangular shape of the video input could be changed to another shape and still be within the scope of the invention. Further, the number of control points could be increased or decreased to correspondingly increase or decrease the accuracy of the transformation. Further still, an image filtering stage could be applied during the inverse texture mapping without deviating from the present invention.

Figure 9:
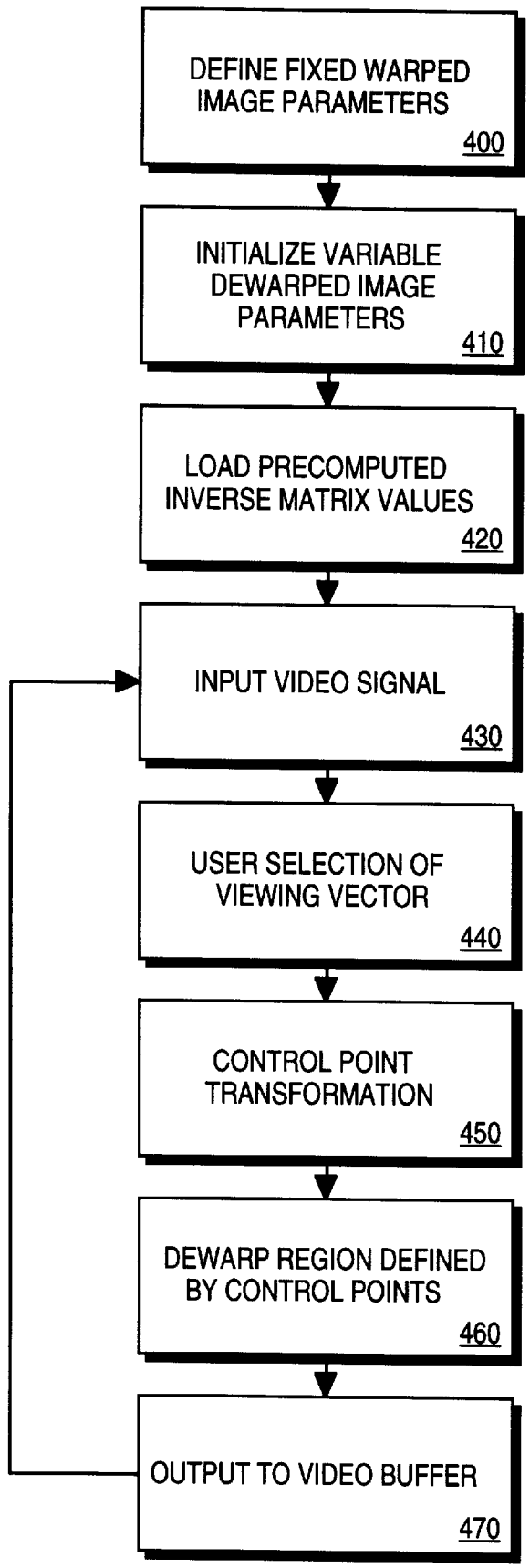
FIG. 9 is a functional flow chart of one embodiment of the present invention.

FIG. 9 shows a functional flow chart of the major elements of one embodiment of the present invention. First, the fixed warped image parameters (step 400) are defined, such as the size of the input image, the input image radius, and the input image center in U-V coordinates typically measured in pixels. The next step 410 is to initialize the variable dewarped image parameters, such as the size of the dewarped image area, the horizontal and vertical field of views (generally shown in degrees), the creation of an untransformed view cone centered in this embodiment on the +Z axis and the initialization of the layout and number control points used therewith. Typically, the next step is to load the precomputed inner-loop matrix values as well as the "xy" product terms, as shown in step 420, to ensure that the transformation is accomplished as quickly and efficiently as possible. In step 430, the video signal is input to the system in any suitable form, i.e. live or pre-recorded real-time digitized video or computer synthesized video environments. The system then allows the user to select the viewing vector (step 440) which in turn determines the portion of video which is to be transformed. The control points are next transformed from the selected viewing vectors (step 450) and the region defined by the control points is dewarped (step 460). The signal is then sent to the video buffer and to an appropriate viewing apparatus (step 470). There is a recursive loop from step 470 to step 430 to allow the video signal to be refreshed, as is needed with live motion video. The loop also allows the user to make on-the-fly selections of alternate portions of the incoming video.

Figure 6:
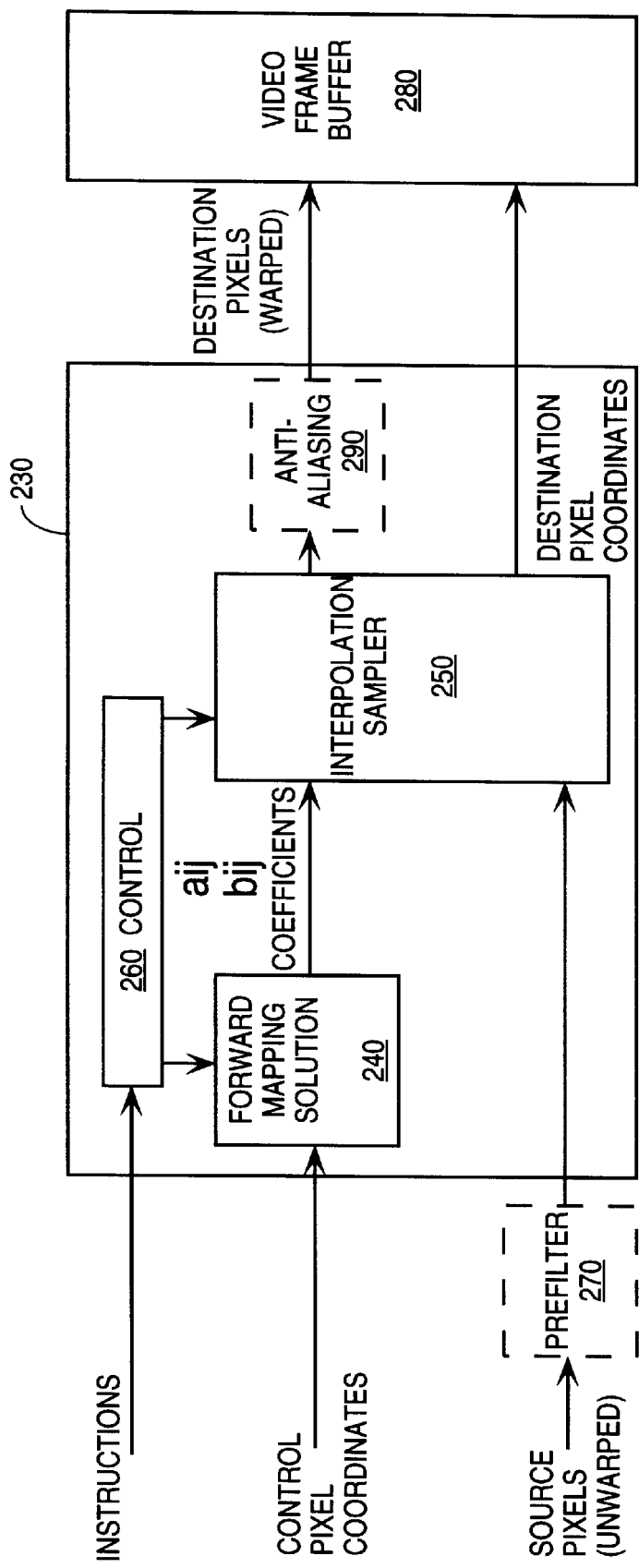
FIG. 6 shows a block diagram of the elements of a forward texture mapping ASIC according to the present invention.
Figure 7:
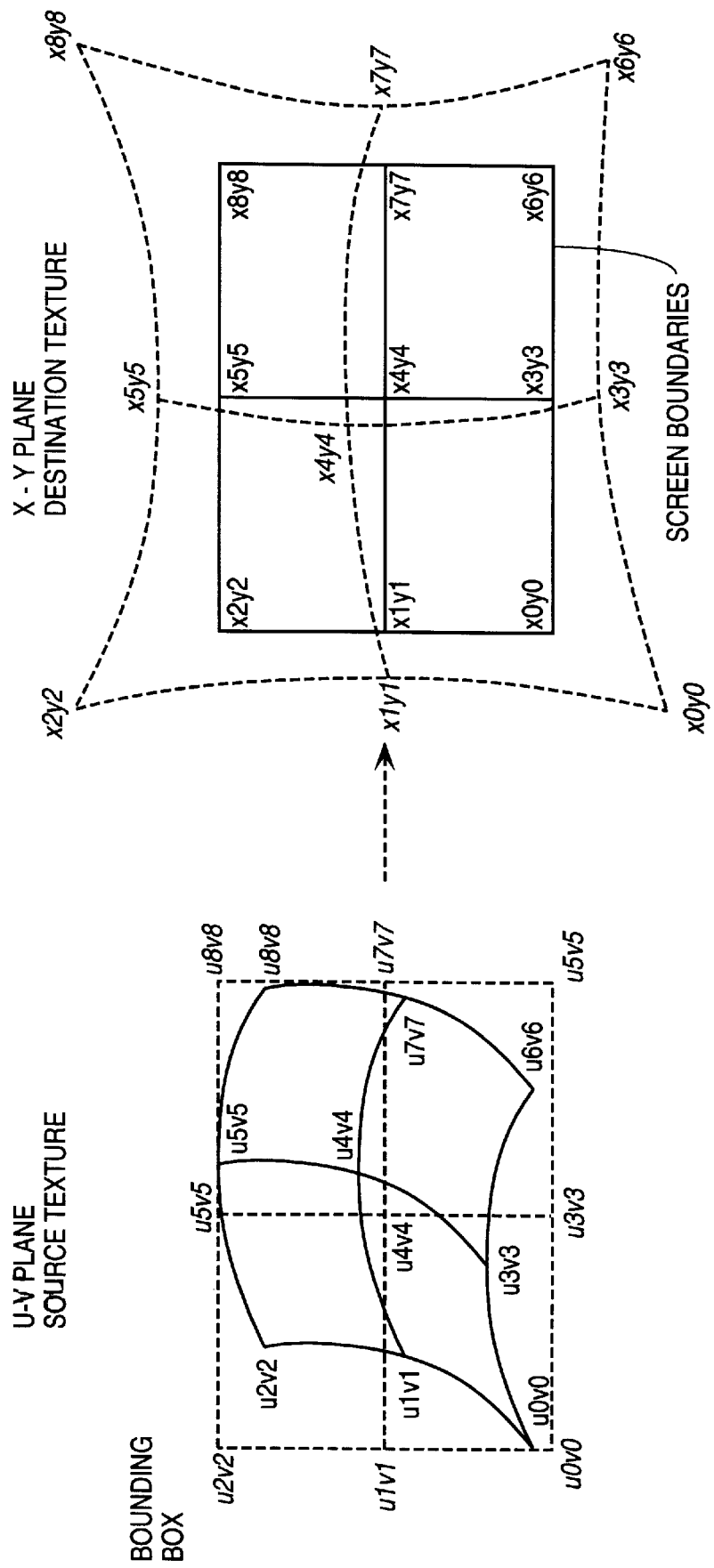
FIG. 7 shows an example of a U-V source texture transformed into a X-Y plane destination texture according to the present invention.

The foregoing description describes an inverse texture mapping technique whereby the biquadratic output (X-Y) is mapped to the input (U-V). In the case where a forward texture mapping ASIC is used, the coordinates for the destination control points in X-Y must be supplied so that the rectilinear source texture region can be mapped from the U-V plane, as provided by the inverse texture mapping software solution above, to the X-Y plane. An example of a forward texture mapping ASIC is the NV-1 chip sold by N-Vidia Corporation. FIG. 6 gives another example of an ASIC chip 230 which accepts control pixel coordinates at a forward mapping solution stage 240. Four pixel coordinates will be accepted for a bilinear mapping, nine in the case of quadratic mapping, 16 in the case of cubic mapping, etc. These control pixels are produced in the host CPU according to the equations (7), below. As shown in FIG. 7, the coordinates of a rectangular bounding box are determined to enclose an exemplary 3×3 grid of control points $u_i v_i$ in the U-V plane. The corners of the bounding box are found from the $u_i v_i$ extrema. Using the same technique described in equations (3), $a_{ij}$ and $b_{ij}$ for N=2 can be solved with the equations (7) for enclosing the region to be warped to the corners of the display screen.

$$x = \sum_{i=0}^{N} \sum_{j=0}^{N-i} a_{ij} u^i v^j \qquad (7)$$

$$y = \sum_{i=0}^{N} \sum_{j=0}^{N-i} b_{ij} u^i v^j$$

Thus, the same control points for the U-V plane map to the corners of the display screen in the X-Y plane. The warped regions outside the bounding box may be clipped by hardware or software so that they are not visible on the display screen.

The source pixel coordinates, which are fed from the host CPU, are converted to $a_{ij}$ and $b_{ij}$ coordinates for forward mapping in the forward mapping solution stage 240, again using techniques mathematically equivalent to those of the equations (7). A series of instructions is further sent from the host CPU to the chip 230 and received by a control unit 260. The control unit 260 sequences and controls the operation of the other functional stages within the chip 230. The host CPU also directs a linear sequence of source pixels, which are to be warped, to an interpolation sampler stage 250 within chip 230. Optionally, these can be subject to a low-pass spatial prefiltering stage 270 prior to transmission to the chip, to reduce sampling error during the warping process. Thus, within the chip 230, the source pixels and the $a_{ij}$ and $b_{ij}$ coordinates are both fed to the interpolation sampler 250. For each input pixel, one or more destination pixels together with their corresponding X-Y destination coordinates are produced. These warped pixels are then fed into the video frame buffer 280, located outside of the ASIC chip 230. Optionally, anti-aliasing circuitry 290 within the chip performs interpolation on output pixel values, such as bilinear interpolation between adjacent pixel samples, to minimize the effects of output spatial quantization error. One skilled in the art will recognize that the preceding hardware solution is merely exemplary and that there are many such solutions which could be employed and still fall within the scope of the present invention.

The techniques described herein may also be applied to synthetic images. Such images may be created entirely within a computer environment and may be composed of three dimensional geometrical descriptions of objects which can be produced by computer graphics rendering techniques generally known to those skilled in the art. Typically, synthetic images are produced by linear perspective projection, emulating the physical process of imaging onto planar film with a lens having a narrow field of view and producing a view of the synthetic environment as seen through a cone or truncated three dimensional pyramid. The color, intensity shading and other simulated physical properties of each pixel on the planar image grid can also be readily determined. For a synthetic environment, the viewing vectors in X-Y-Z space are rewritten in terms of the warped control points coordinates in the U-V plane.

$$r = \sqrt{u^2 + v^2} \quad (8)$$
$$s = \frac{r}{RADIUS}$$
$$x = \frac{us}{r}$$
$$y = \frac{vs}{r}$$
$$z = \sqrt{1 - s^2}$$

A direction vector in X-Y-Z space can thus be generated for each pixel in the U-V plane in the synthetic wide angle image which is created. For a perfect hemispherical fisheye, the generated vectors point in all directions within the created hemisphere, spaced to the limits of the resolution of the U-V image. This simulates a non-planar image grid, such as the projection of the synthetic environment onto a surface of a spherical image substrate. In this way, a fisheye or other wide angle image of a synthetic three dimensional environment can be produced. This technique can be used for the production of three dimensional modeled cartoons or interactive home gaming applications, among others.

One skilled in the art will appreciate that the present invention may be applied to a sequence of wide angle images changing in time, either live or recorded to an analog or digital storage media. The image substrate for recordation may be an electronic two dimensional image sensor, such as a CCD chip, or photographic film capable of chemically recording the image for subsequent transfer into digital form.

One skilled in the art will also appreciate that the present invention is not limited to transforming wide angle video onto a planar (U-V) surface, but that it is within the scope of the invention to transform wide angle video onto any suitable surface for displaying the video for the user.

Figure 8:
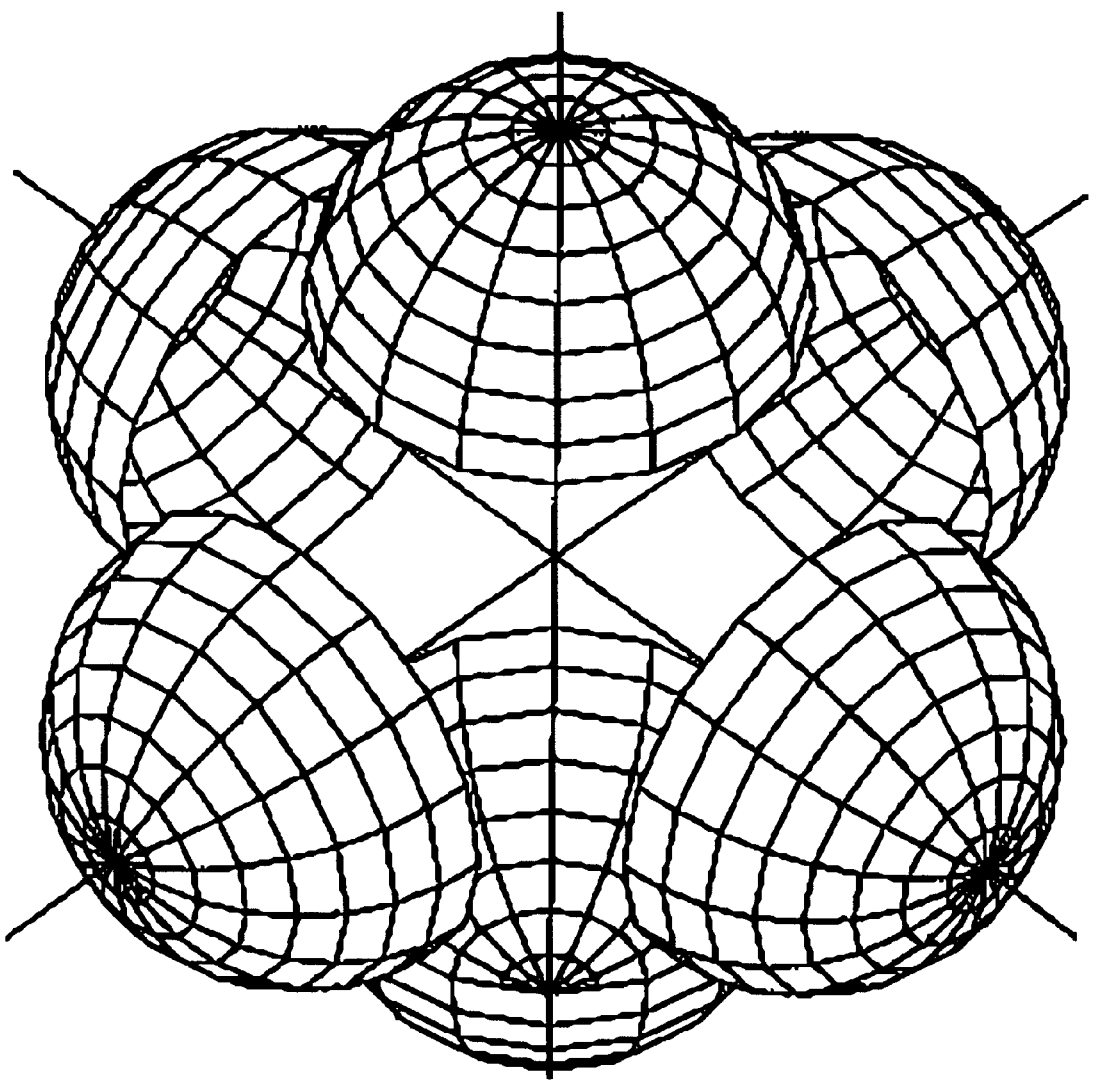
FIG. 8 is one embodiment of how to obtain a 360 degree view using six hemispherical fisheye lenses according to the present invention.

Further, two real world, wide angle lenses can be positioned opposite each other to permit near 360 degrees of total coverage of the environment. If seamless omnidirectional coverage of an environment is required, this could be achieved with six wide angle lenses positioned along each direction of a three dimensional axis, as shown in FIG. 8. This arrangement can be coupled with a video switching mechanism for choosing which signal is to be dewarped for the selected view and orientation of the video input.

Further still, the same video signal may be simultaneously transmitted to an arbitrarily large number of viewers all having the ability to simultaneously dewarp the same or different portions of the video input, as in the case of interactive cable TV viewing or multiple player online interactive video game playing.

Having fully described the preferred embodiment of the present invention, it will be apparent to those of ordinary skill in the art that numerous alternatives and equivalents exist which do not depart from the invention set forth above. It is therefore to be understood that the present invention is not to be limited by the foregoing description, but only by the appended claims.

What is claimed is:

1. A method of performing perspective correction, said method comprising:
   capturing a distorted image with a wide-angle lens;
   transforming a set of control vectors into a set of control points using a function that models said wide angle lens;
   generating a polynomial transform function that maps said control points into rectangular points; and
   transforming a sub area of said distorted image proximate to said control points using said polynomial transform function.

2. The method of claim 1 wherein said polynomial transformation comprises a global bivariate polynomial transformation.

3. The method of claim 1 wherein said polynomial transformation comprises a biquadratic polynomial transformation.

4. The method of claim 1 wherein said set of control vectors comprise a principal viewing and eight surrounding vectors that form a rectangular view.

5. The method of claim 1 wherein said wide-angle lens comprises a fish eye lens.

6. The method of claim 1 wherein said image capture system comprises a video digitizer.

7. The method of claim 1 wherein said transformation is performed by a hardware texture mapping device.

8. A computer apparatus for performing perspective correction, said apparatus comprising:
   an image capture system for capturing a distorted image with a wide-angle lens;
   a processor, said processor for transforming a set of control vectors into a set of control points using a function that models said wide angle lens and generating a polynomial transform function that maps said control points into rectangular points; and
   a transform engine, said transform engine transforming a sub area of said distorted image proximate to said control points using said polynomial transform function.

9. The computer apparatus of claim 8 wherein said polynomial transformation comprises a global bivariate polynomial transformation.

10. The computer apparatus of claim 8 wherein said polynomial transformation comprises a biquadratic polynomial transformation.

11. The computer apparatus of claim 8 wherein said set of control vectors comprise a principal viewing and eight surrounding vectors that form a rectangular view.

12. The computer apparatus of claim 8 wherein said wide-angle lens in said image capture system comprises a fish eye lens.

13. The computer apparatus of claim 8 wherein said image capture system comprises a video digitizer.

14. The computer apparatus of claim 8 wherein said transformation is performed by a hardware texture-mapping device.

15. A computer readable medium storing a method of performing perspective correction that operates by:
- capturing a distorted image with a wide-angle lens;
- transforming a set of control vectors into a set of control points using a function that models said wide angle lens;
- generating a polynomial transform function that maps said control points into rectangular points; and
- transforming a sub area of said distorted image proximate to said control points using said polynomial transform function.

16. The computer readable medium of claim 15 wherein said polynomial transformation comprises a global bivariate polynomial transformation.

17. The computer readable medium of claim 15 wherein said polynomial transformation comprises a biquadratic polynomial transformation.

18. The computer readable medium of claim 15 wherein said set of control vectors comprise a principal viewing and eight surrounding vectors that form a rectangular view.

19. The computer readable medium of claim 15 wherein said wide-angle lens comprises a fish eye lens.

20. The computer readable medium of claim 15 wherein said transformation is performed by a hardware texture mapping device.

* * * * *